(12) United States Patent  
Herbert

(10) Patent No.: US 6,992,906 B1  
(45) Date of Patent: Jan. 31, 2006

(54) SYNTHETIC RECTIFIERS

(76) Inventor: Edward Herbert, 1 Dyer Cemetery Rd., Canton, CT (US) 06019-2029

( * ) Notice: Subject to any disclaimer, the term of this patent is extended or adjusted under 35 U.S.C. 154(b) by 230 days.

(21) Appl. No.: 10/707,189

(22) Filed: Nov. 25, 2003

Related U.S. Application Data

(60) Provisional application No. 60/432,509, filed on Dec. 10, 2002, provisional application No. 60/441,953, filed on Jan. 23, 2003.

(51) Int. Cl.  
*H02M 7/217* (2006.01)  
*G05F 1/10* (2006.01)

(52) U.S. Cl. .......................... 363/127; 363/76; 363/80; 323/222; 323/284

(58) Field of Classification Search ............. 363/21.06, 363/21.14, 76, 77, 79, 80, 89, 127; 323/222, 323/225, 259, 284

See application file for complete search history.

(56) References Cited

U.S. PATENT DOCUMENTS

| | | | |
|---|---|---|---|
| 6,021,059 A * | 2/2000 | Kennedy | 363/127 |
| 6,271,712 B1 * | 8/2001 | Ball | 363/127 |
| 6,421,261 B1 * | 7/2002 | Fujisawa et al. | 363/127 |
| 6,430,071 B1 * | 8/2002 | Haneda | 363/127 |

* cited by examiner

*Primary Examiner*—Jessica Han

(57) ABSTRACT

A synthetic rectifier comprises a MOSFET and a control circuit to turn the MOSFET off and on as a synchronous rectifier. The control circuit senses the current through the synthetic rectifier, and in particular is responsive to the rate of decrease of the current so as to anticipate when the current goes to zero and turn off at that instant. The control circuit also senses the voltage across the synthetic rectifier, and in particular is responsive to the rate of decrease of the voltage so as to anticipate when the voltage goes to zero and turn on the synthetic rectifier at that instant. In another embodiment of the invention, the MOSFET comprises groups of cells that can be individually controlled. As the current is decreasing, groups of cells can be turned off progressively as the current decreases so that only a small number of cells which can be turned off very fast is still conducting as the current goes to zero.

12 Claims, 4 Drawing Sheets

US 6,992,906 B1

SYNTHETIC RECTIFIERS

CROSS REFERENCE TO RELATED APPLICATIONS

This application is a continuation in part application of a provisional patent applications entitled "Super Rectifiers", Ser. No. 60/432,509, filed on 10 Dec., 2002, and a provisional patent applications entitled "Super Rectifiers", Ser. No. 60/441,953, filed on 23 Jan., 2003.

BACKGROUND OF INVENTION

This application relates to integrated circuits, and more particularly to a MOSFET with an integrated controller driver circuit to function as a rectifier.

When using the terms "integrated" or "integrated circuit", it is to be understood that an integrated circuit is the preferred method of construction, but the teachings of this invention would be equally applicable to a circuit made partly of integrated circuits or entirely of discrete components.

U.S. Pat. No. 6,271,712, Alan Ball, issued Aug. 7, 2001 and entitled "Synchronous Rectifier and Method of Operation" shows an integrated synchronous rectifier intended for the same applications as the synthetic rectifier of this invention. In distinction to the present invention, Ball switches reactively after sensing zero crossing of the current or the voltage, and does not have or suggest any predictive mechanism.

Ball teaches a method of controlling voltage to power a synchronous rectifier controller that could be useful in the present invention. However, it is a variant of a boot strap power supply circuit which is well known. Two of the five independent claims recite a "polarity detection circuit" to operate the synchronous rectifier MOSFET, the other three independent claims relate to the power supply circuit portion.

Problems with Prior Art Synchronous Rectifier Controllers:

1. There is no signal available that reliably predicts when a MOSFET rectifier should change state.
2. There is no way to reliably predict when switching should be initiated to achieve a specific turn-off time.
3. Those signals that are available may involve complex interfaces.

To elaborate, turn-on and turn-off is usually initiated by sensing that a voltage has changed, somewhere. This may be through an isolation barrier from a primary controller, a complex interface. It may be a signal from a buck controller. It may be the voltage reversal on a transformer winding. In all cases, the time to ideal switching is dependant upon the load current and other factors. It would take a very complex algorithm to know the precise moment that state switching should occur. Even if the precise ideal switching time could be determined, the time that it takes to accomplish turn-on or turn-off is not well controlled.

Prior Art Predictive gate drive: A signal to switch the MOSFET is derived from a controller section and inserts a digitally derived time delay to correct for the time that it takes the current or voltage to settle down as well as the propagation time delay in the circuits in a trial and error detection scheme. The results from one interation are modified and saved from cycle to cycle in an algorithm that corrects for the cumulative time delays so that the MOSFET turns on or off at nearly the optimum time. This is a complex circuit and it does not respond rapidly to changes in the load conditions.

The proposed synthetic rectifier overcomes these limitations.

This application builds upon the technology of a provisional patent application entitled "Gate Drive Method and Apparatus for the Fast Switching of MOSFETs" Ser. No. 60/429,998, filed on 30 Nov., 2002; a provisional patent application entitled, entitled "Gate Drive Method and Local Clamp for the Fast Turn Off of MOSFETs", Ser. No. 60/319,085 filed on 22 Jan., 2002; and a continuation in part patent application entitled "Gate Drive Method and Apparatus for Reducing Losses in the Switching of MOSFETs", Ser. No. 10/248,438, filed on Jan. 20, 2003. These applications are incorporated herein by reference.

SUMMARY OF INVENTION

This invention teaches the "synthetic rectifier," an integrated circuit comprising a MOSFET and control circuits to simulate an ideal rectifier.

The synthetic rectifier is designed and characterized specifically to replace rectifiers and synchronous rectifiers in power converters.

The synthetic rectifier is self-contained, and requires no external control inputs or stimuli. In this respect, it resembles a discrete rectifier, although it may require a Vcc input in some applications.

The synthetic rectifier has the forward voltage drop and reverse blocking characteristics of a MOSFET. In this respect, it resembles a synchronous rectifier, except that it doesn't have the timing and control problems.

The synthetic rectifier can be used in a number of power converter applications, including the secondary circuit of a transformer isolated forward or push-pull buck converter or a non-isolated buck converter.

BRIEF DESCRIPTION OF DRAWINGS

FIG. 6 shows that the reverse voltage across a power converter rectifier will ramp down prior to the time that it must turn on.

In FIG. 15, a few cells are turned off (no "X"). In FIG. 16, more cells are turned off, and in FIG. 17, most of the cells are turned off.

DETAILED DESCRIPTION

The synthetic rectifier can be used in a number of power converter applications, including the secondary circuit of a transformer isolated forward or push-pull converter or a non-isolated buck converter.

Figure 1:
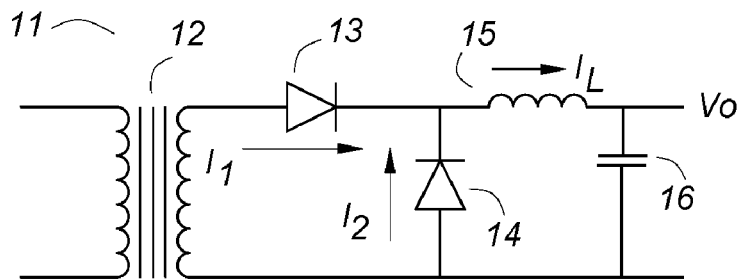
FIG. 1 shows the essential secondary side circuit of a forward converter.

FIG. 1 shows a partial circuit 11 having the essential parts on the secondary side of a transformer isolated forward buck converter having an output voltage Vo. The secondary of a transformer 12 is connected to a first rectifier 13 that in turn is connected to an inductor 15 and then to an output capacitor 16. A catch rectifier 14 sustains the current $I_L$ when the first rectifier 13 is not conducting.

Figure 2:
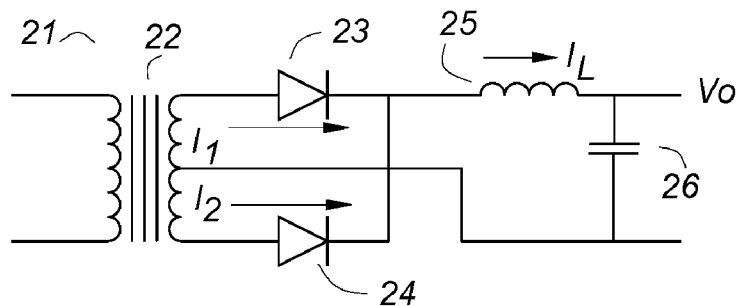
FIG. 2 shows the essential secondary side circuit of a push-pull buck converter.

FIG. 2 shows a partial circuit 21 having the essential parts on the secondary side of a transformer isolated push-pull buck converter having an output voltage Vo. The push-pull secondary winding of a transformer 22 is connected to first and second rectifiers 23 and 24 that in turn are connected to an inductor 23 and then to an output capacitor 26

Figure 3:
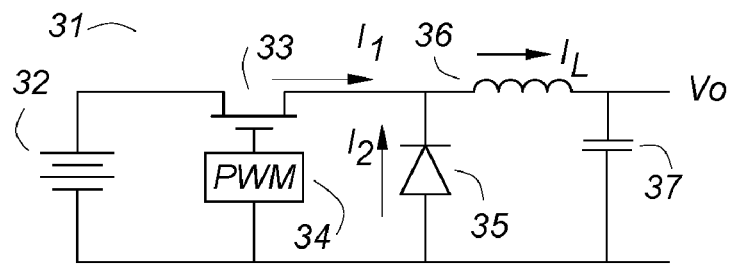
FIG. 3 shows a non-isolated buck converter.

FIG. 3 shows a partial circuit 31 having the essential parts of a non-isolated buck converter having an output voltage Vo. A voltage source 32 is connected to a MOSFET (metal oxide silicon field effect transistor) 33 that is controlled by a PWM (pulse width modulation) controller 34. The MOSFET 33 is then connected to an inductor 36 that in turn is connected to an output capacitor 37. A catch rectifier 35 sustains the current $I_L$ when the MOSFET 33 is turned off.

Figure 4:
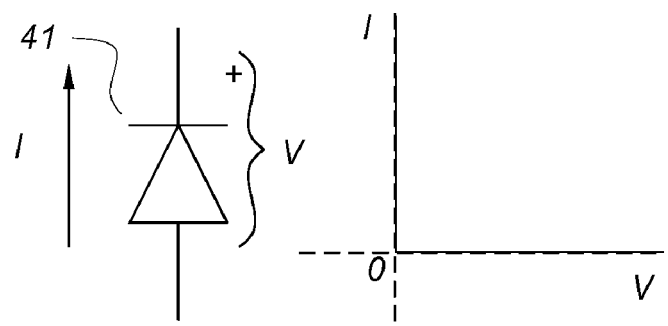
FIG. 4 shows the characteristics of an ideal rectifier.

As shown in FIG. 4, an ideal rectifier 41 has zero voltage drop in one direction, and conducts zero current in the other. Practical rectifiers have significant voltage drop. In modern power converters, MOSFETs are often used as synchronous rectifiers. Their ON and OFF states approach the ideal rectifier, but their control and timing is problematical.

The synthetic rectifier of this invention comprises integrated circuit having a MOSFET switch with a drive and control circuit that is entirely self-sensing. Possibly a Vcc input would be needed (which could powered by a bootstrap circuit in some applications), but no other control or sensing inputs are necessary.

Present art sense, control and gate drive circuits are very fast. The characteristics of the power converter environment help. Moore's law applies to analog circuits as well, so continued improvement will be expected over time.

Rectifier Turn Off and Turn On:

The ideal rectifier integrated circuit should conduct with a low voltage drop when forward biased, and should block with a high impedance when reverse biased, with reference again to FIG. 4.

When conducting, the rectifier control should sense when the forward current through the rectifier becomes zero, and turn off. When blocking, the rectifier control should sense when the reverse voltage across the rectifier becomes zero, and turn on.

Fortunately, as will be shown below, the environment of rectifiers in a power converter is very helpful.

Figure 5:
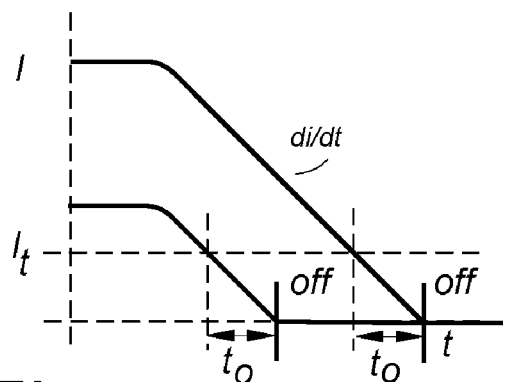
FIG. 5 shows that the current in a power converter rectifier will ramp down prior to the time that it must turn off.

FIG. 5 shows the current through the rectifier prior to the time to turn off. The current will ramp down to zero at a fairly constant rate (−di/dt). Once the current has begun to ramp down, it will not reverse direction or change its rate appreciably, making it possible to sense a negative di/dt and progressively turn off the device so that it is fully turned off just at zero.

As the current is ramping down, the MOSFET should begin to turn off, so that when the current reaches zero, the MOSFET should be turned off completely. It can be turned off progressively, first a large slow section, then a faster section, and then a final fast section. The final fast section may not be a MOSFET at all. It could be a very small Schottky that can handle the small current remaining just as the current goes to zero.

FIG. 5 also shows that in a circuit with a reasonably predictable −di/dt, a current threshold $I_t$ can be sensed to initiate turn off. With a constant −di/dt, the time the reaching the current threshold $I_t$ to the ideal turn off time is constant. Knowing the time that it takes to turn off a MOSFET in a particular application, the threshold current $I_t$ can be set such that the current reaches zero just as the turn off is achieved. The threshold current is the product of the rate of the decrease of current in amperes per second and the time that it takes to turn off the MOSFET in seconds.

Figure 6:
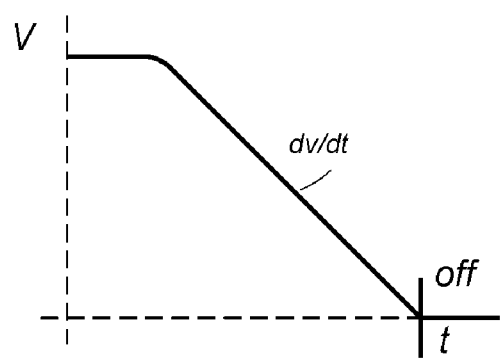

FIG. 6 shows the voltage across the rectifier prior to the time to turn on. The voltage will ramp down to zero at a fairly constant rate (−dv/dt). Once the voltage has begun to ramp down, it will not reverse direction or change its rate appreciably, making it possible to sense a negative dv/dt and turn on at near zero volts.

Once the voltage has ramped to zero, the MOSFET should start to turn on, otherwise the body diode of the MOSFET will be forced on. That is not necessarily bad, but it is not preferred. Being inductively fed, the current will ramp up from zero, so that it is not necessary to turn on the entire MOSFET at once. It can be turned on progressively as the current ramps up, first a fast section, then maybe an intermediate section, then maybe a larger, very low Rdson section. The first section might not be a MOSFET at all. It could a very small Schottky rectifier that can handle the low current that first occurs near the crossover and for the very short time until the MOSFETs can be turned on.

Figure 7:
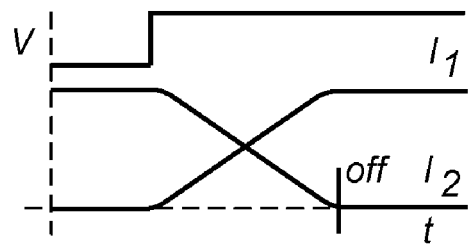
FIG. 7 shows that the current in a first rectifier ramps up as the current in a second rectifier ramps down after the voltage switches.

While the above characterizes the current and voltage during normal PWM operation, the control circuitry must be able to handle an abnormal condition, caused, perhaps by a transient condition or a hiccup in the control. Obviously, if the current starts to ramp down, but then reverses and ramps up again, the rectifier must remain on. If the reverse voltage starts to ramp down, but reverses and ramps up again, the rectifier must remain off. The above does not take into account the initial state of the rectifier upon application of power. If it powers up forward biased, it should turn on, or the body diode of the MOSFET will conduct. If it powers up reverse biased, it should remain off. (If the logic is powered from a boot-strap power supply, however, it may not be possible to turn on the MOSFET and operate normally for a cycle or two, until the boot-strap capacitor charges.)Secondary side synthetic rectifiers:

With reference again to FIG. 1, consider the case of a transformer coupled forward converter 11. A PWM converter (not shown) in the primary has changed state, and the flux has changed direction in the transformer 12, causing a change in potential, say from negative to positive as shown in FIG. 7. Prior to changing state, the negative secondary voltage had charged the parasitic capacitance of the first rectifier 13 to a negative potential.

First, the parasitic capacitance of the first rectifier 13 will be discharged to zero by a current $I_1$. This current ramps up at a rate (di/dt) determined by the secondary voltage and the transformer leakage inductance $L_f$. Once the capacitance has discharged to zero, the first rectifier 13 will turn on, and the current $I_1$ will continue to ramp up until it equals the output inductor current $I_L$.

While the current $I_1$ through the first rectifier 13 is ramping up, the current $I_2$ through the second rectifier 14 must ramp down, as the sum of the currents $I_1$ and $I_2$ must equal $I_L$, which is a constant over the time of interest. The relationship of the currents $I_1$ and $I_2$ and the change in voltage in the transformer's 12 windings is shown in FIG. 7.

When the current through the second rectifier 14 reaches zero, the second rectifier 14 turns off. Note that the di/dt is determined by the voltage and the leakage inductance. If the load current is higher, the di/dt will be the same, but the time span will be longer. This is shown in FIG. 5.

Consider now that the first and second rectifiers 13 and 14 could be synthetic rectifiers of this invention. When the voltage across the first rectifier 13 ramps down to zero, it must turn on. When the current through the second rectifier 14 ramps down to zero, it must turn off. Their respective integrated control circuits must accomplish this as nearly ideally as is feasible.

At the end of the cycle the voltage reverses again. The current in the first rectifier 13 will ramp down to zero and it turns off. The voltage in the second rectifier 14 will ramp down to zero and it turns on. Though not shown, again the current will be a ramp di/dt, determined by the voltage and the leakage inductance. The voltage will also be a ramp dv/dt, determined by the current and the junction capacitance.

Non-Isolated Buck Converter:

Let us now consider once again the dc-dc non-isolated buck converter 31 of FIG. 3. A dc voltage source 32 provides power to a MOSFET 33 which is controlled by a PWM controller 34. During the OFF time, a rectifier 35 conducts a current $I_2$ to an inductor 36 having a current $I_L$. An output capacitor smoothes the output voltage.

The current $I_1$ through the MOSFET 33 is a function of the gate voltage Vg. Note that the PWM controller 34 operates autonomously, without regard to the state of the rectifier 35. It turns ON and OFF as necessary for its voltage control function.

Consider now that the rectifier 35 is a synthetic rectifier of this invention. As long as the synthetic rectifier is able to simulate an ideal rectifier, circuit operation will be correct. (That does not mean that the PWM controller and the synthetic rectifier might not be a matched set, to optimize overall performance, and they might very well be in one integrated circuit, perhaps pin compatible with other controllers.)Synthetic rectifier turn-off in a buck regulator:

Consider the case of the MOSFET 33 turning ON. When the MOSFET 33 is fully ON, the synthetic rectifier 35 must turn OFF.

Figure 8:
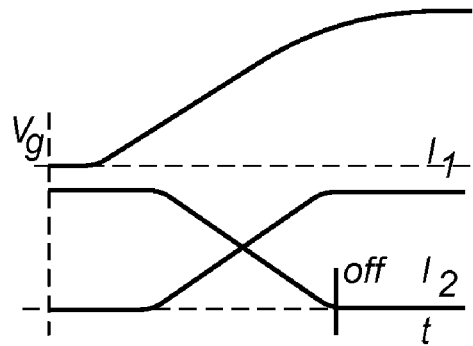
FIG. 8 shows that the current in a MOSFET ramps up as the gate voltage increases. As the current in the MOSFET ramps up, the current in the rectifier ramps down.

The MOSFET 33 is turned ON by applying a voltage $V_g$ to the gate, and since the gate has significant capacitance and resistance, the gate voltage $V_g$ will rise at a rate determined by the voltage, the gate capacitance and the resistance, as a classical RC time constant (neglecting non-linearity) as shown in FIG. 8.

Because the MOSFET 33 is a transconductance device, the current $I_1$ will increase at a rate determined by the increase in the gate voltage $V_g$, that is, it will ramp up from the time the voltage crosses the cut-off threshold until the MOSFET 33 is fully on. The current $I_L$ thus has the same general behavior as a current through an inductor with a step change in voltage.

Because the current $I_L$ through the output inductor 36 is constant during the time period of interest, as the current $I_1$ through the MOSFET is ramping up, the current $I_2$ through the synthetic rectifier is ramping down correspondingly. When the current $I_2$ in the synthetic rectifier reaches zero, the synthetic rectifier should turn OFF completely. This relationship between the currents $I_1$ and $I_2$ and the gate voltage $V_g$ is shown in FIG. 8.

Figure 9:
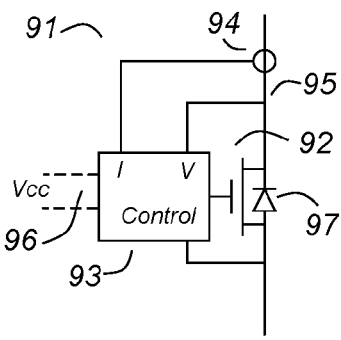
FIG. 9 is a simplified bloc diagram of a synthetic rectifier.

FIG. 9 shows diagrammatically how a synthetic rectifier 91 of this invention is made. A MOSFET 92 is controlled by a control circuit 93. The control circuit 93 has a current sense means 94 and a voltage sense means 95. The voltage control circuit 93 may derive its operating power from the sensed voltage 95 in a boot strap circuit. In some applications, it may be desired to use a Vcc input 96 instead, either to optimize the circuit or perhaps because it is used in a low voltage circuit where the sensed voltage is too low to operate the logic and drive the gate of the MOSFET 92. The body diode 97 of the MOSFET 92 is shown for reference.

For turn off, given the ability to sense current and the ramp rate of the current, di/dt, it is possible to calculate the time until the current reaches zero and turn off should be accomplished. Also, for turn on, given the ability to sense voltage and the ramp rate of the voltage dv/dt, it is possible to calculate the time until the voltage reaches zero and turn on should be initiated. A controller can make such calculations and initiate a change of state accordingly. However, in a power converter, the times involved may be very fast, and it may not be practical to make a controller that operates using such calculation for some circuits. Examples where it would be possible and practical would include the current through the catch diode in a discontinuous buck converter or a discontinuous boost converter. Also, in converters with low voltages and large leakage inductances, or low currents and large stray capacitances, the ramp rates would be relatively slow.

That a calculation and control cannot be done ideally does not, however, render the approach impractical given the state of prior art controllers. A number of refinements are taught that make the synthetic rectifier practical for many applications.

Turn-On Timing is Less Critical:

Similar analyses of the various rectifiers in power converter output circuits shows that the current always ramps down at a fairly constant rate, allowing an orderly preparation for turn-off. The voltage always ramps down at a fairly constant rate, allowing an orderly preparation for turn-on. From cycle to cycle, the ramp rates may vary as the operating point changes, but in a given cycle the operating point will not change fast enough to change the ramp rates.

Figure 10:
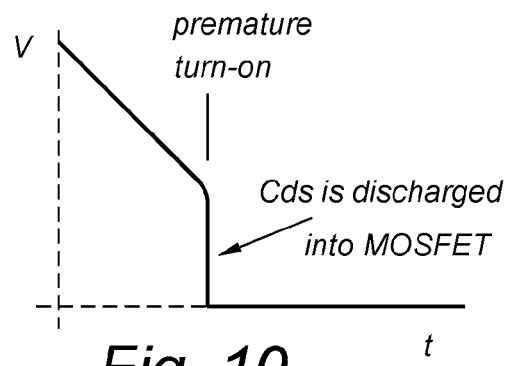
FIG. 10 shows that the turn on timing is less critical. A premature turn on results in some charge discharged into the channel as there is still a voltage from drain to source.
Figure 11:
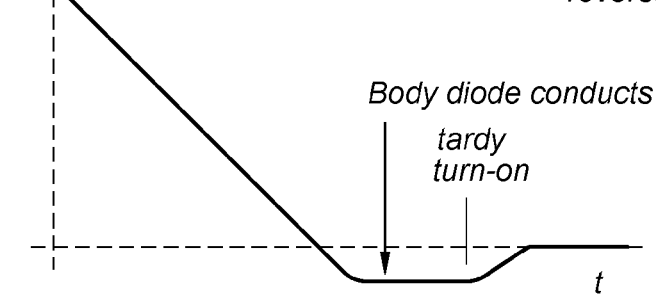
FIG. 11 shows that the turn on timing is less critical. A tardy turn on results in the body diode conducting momentarily.

There is latitude in the timing for turn-on, because the consequences of missing the ideal time are not serious. As long as the voltage is ramping down and the ramp is well established, a premature turn on as shown in FIG. 10 will result in the discharge of some charge into the MOSFET channel, but it will have no effect on the overall circuit performance. Likewise, a tardy turn on as shown in FIG. 11 will result in the body diode of the MOSFET conducting for a brief period, but it will have no effect on the overall circuit performance. The currents are determined by the external components and conditions, and the state of the rectifier will not change the current appreciably.

Figure 12:
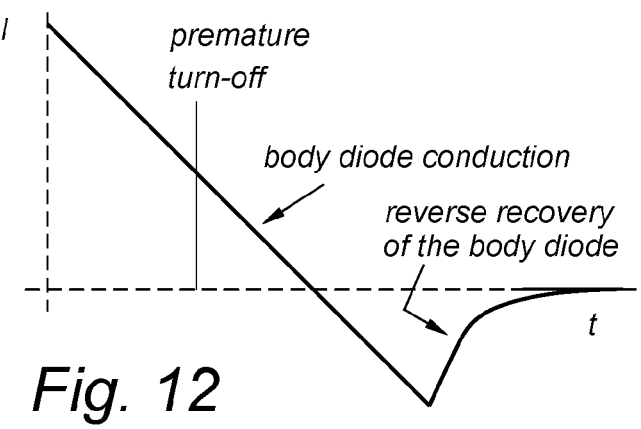
FIG. 12 shows that that the turn off timing is more critical. If the MOSFET turns off too soon, then the body diode will conduct, and the final turn off will have the reverse recovery characteristics of the body diode.

Turn-Off Timing is More Critical:

If the MOSFET in the synthetic rectifier is turned off too soon, current will flow none-the-less, through the body diode of the MOSFET. When the current reverses, the reverse recovery characteristics of the body diode will determine the behavior of the synthetic rectifier, as shown in FIG. 12.

Figure 13:
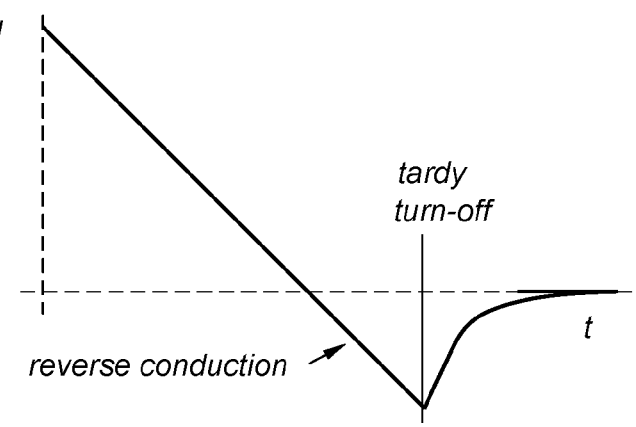
FIG. 13 show tht the turn off timing is more critical. If the turn off is tardy, reverse conduction will occur, simulating the reverse recovery of a junction rectifier.

If the MOSFET in the synthetic rectifier is turned on too late, the current will continue to ramp down to a significant negative value. Turn-off under those conditions will interrupt a flowing current, perhaps causing an inductive kick. Regardless, permitting a negative current will give the device an apparent reverse recovery, as shown in FIG. 13.

There is some latitude, however. Remember that the MOSFET has significant capacitance, and near the ideal time for turn-off, the current is approaching and crossing zero. The MOSFET can be turned off early without much consequence if the current tail is less than that needed to charge the capacitance to the forward conduction potential of the body diode. The MOSFET can be turned off late if the remaining current conducted through the channel is small compared to the capacitance charging current in the reverse direction.

Ensuring Accurate Turn-Off Timing:

As compared to prior art control methods for synchronous rectifiers, the synthetic rectifier triggers on events that can be detected within the synthetic rectifier to precisely determine the correct time to change state. Further, well in advance of the threshold event, the voltage or current is falling at a fairly steady rate, allowing anticipation. This contrasts with other control methods which trigger on events that have a variable time relationship with the optimum switching times. Even so, very fast sensing and switching is necessary for optimum performance, especially turn-off.

Fortunately, there are a number of techniques that can be used to ensure accurate turn-off timing, as explained in the following pages.

1. Threshold hugging.
2. Progressive turn-off.
3. Specialized cells and/or drivers.
4. Voltage controlled turn-off.
5. Optimizing the controller switching rates.
6. Use other stimuli.

Figure 14:
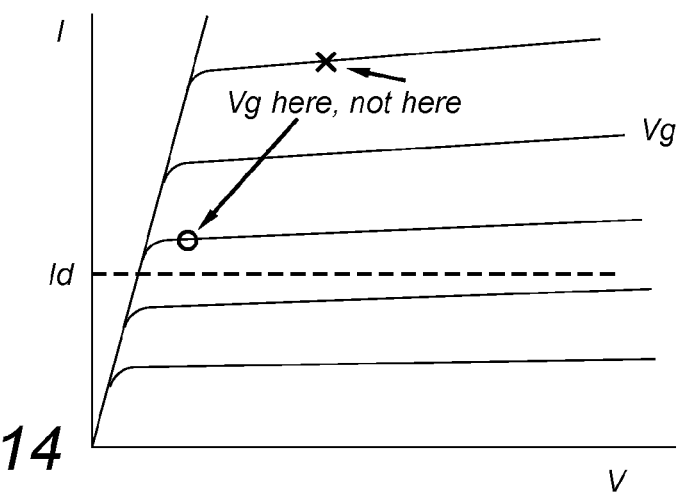
FIG. 14 shows the transconductance curves for a MOSFET, and also shows that the preferred gate voltage is sufficient to maintain a low $R_{DSon}$, but not excessive.

Threshold Hugging:

During the ON time, the gate voltage should be controlled to be just sufficient to hold the $R_{DS}$ low, as shown in FIG. 14.

It may be desirable to overdrive the gate somewhat at turn-on, but during the on time, the gate voltage should be regulated as a function of current. Normally, the current will ramp up, and the gate voltage should follow, just enough to maintain low $R_{DS}$.

In this way, the delay of removing excess charge from the gate will be avoided and the switching time will be faster.

Progressive Turn-Off:

A MOSFET comprises a very large number of cells, each with its own gate. In theory, each cell could be individually controlled. More practically the cells of the MOSFET can be divided into groups, and the groups can be individually controlled with each group having an individual gate connection and with individual control circuit outputs connected respectively to the individual gate connections.

Figure 15:
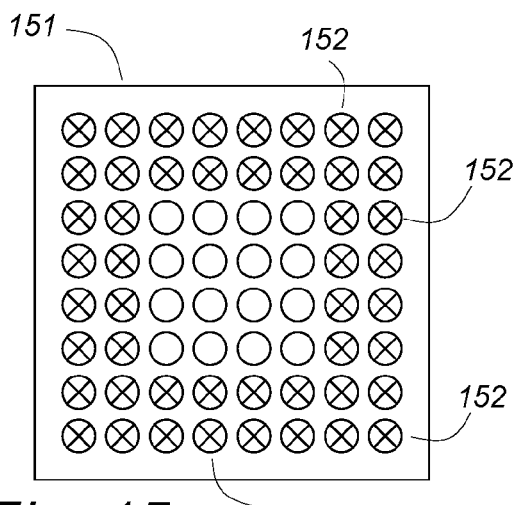
FIGS. 15, 16 and 17 show a MOSFET with individually controlled groups of cell, and shows progressive switching.
Figure 16:
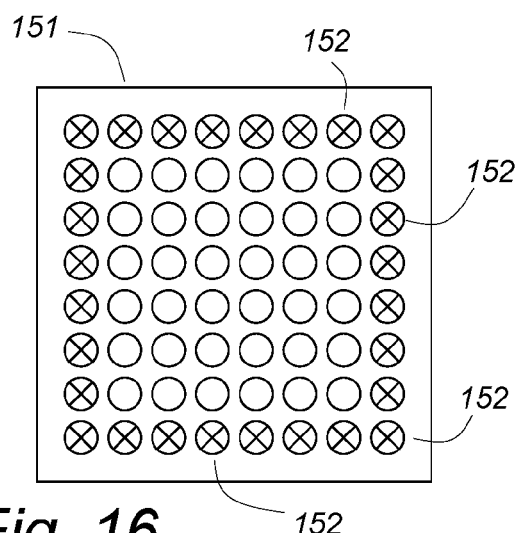
Figure 17:
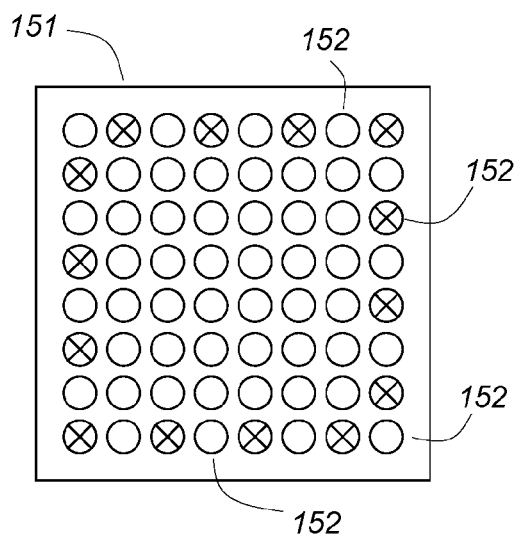

As the current is ramping down, groups of cells can begin to be turned off well before the time that the MOSFET as a whole must be OFF. The remaining cells will carry the reduced current. FIGS. 15, 16 and 17 show a MOSFET die 151 having a large number of cells 152—152 that can be controlled in groups. The cells 152—152 that are conducting show an "X", representing current flow, or an empty circle, indicating that the cell is off. In FIG. 15, a few of the cells are off. In FIG. 16, more of them are off, and in FIG. 17, almost all of them are off.

It is also possible that some groups of cells would remain off all the time if the current were low. Because the di/dt is fairly constant, the necessary reaction time to turn off a low current is shorter than for a high current. Having fewer groups of cells to turn off could be helpful.

As an example, once the current fell to half, three fourths of the cells could be turned off. The remaining one fourth could sustain half of the current for the time remaining in the turn off cycle. Once the current fell to one quarter, all but one sixteenth of the cells could be turned off, and so forth.

Progressive Turn-On:

Once the voltage ramps to zero, and the rectifier turns on, the current will ramp up at a rate determined by the circuit voltages and inductances. It is preferred to turn on at least a first group of cells very quickly, so that the body diode is not forced into conduction, but the current is low at first, so it can be a small, very fast part of the MOSFET, and the other groups of cells can turn on progressively as the current increases.

Light Loads:

A corollary benefit of configuring the MOSFET switch for progressive turn-off is that it can be used for steady state as well, turning on only as many cells as is necessary. Thus, for light loads, the gate drive energy will be reduced, for greater efficiency and lower idle state current draw.

Schottky Rectifier

The last part turned off and the first part turned on need not be part of the MOSFET at all, but can be a very small Schottky rectifier, just enough to handle the small current near transition and only for a very brief moment.

Progressive Thresholds:

Another method of turning off progressively is to have "progressive thresholds", wherein various cells would be doped to have different threshold voltages. Growing a thicker dielectric layer would also increase the threshold voltage and is equivalent in circuit operation.

A first group, having a larger percentage of the cell population, might be doped to switch at a relatively high voltage, a smaller group at an intermediate voltage and a yet smaller group at a lower voltage. Alternatively, the spread could be a fairly continuous distribution from higher voltage to lower voltage.

Regardless of the details, a common driver could begin reducing the gate of the whole group of cells in relation to the current as it dropped. As the gate voltage dropped, first some, then more and more cells would pinch off until only a few were conducting just before the current ramped to zero.

These last may be in a different class, using maybe voltage controlled turn off, or it may be a small Schottky rectifier.

In turn on, the gate voltage would rise, turning on a few, then more as the load current ramps up. For light loads, the gate might be increased to an intermediate level, commensurate with the light load (a form of threshold hugging as well, poised for fast turn off).

Specialized Cells and/or Drivers:

A MOSFET comprises a very large number of cells. Usually, they are all pretty much the same, but that is not necessary. Certain cells, or groups of cells, and/or their drivers, could be specialized.

Figure 18:
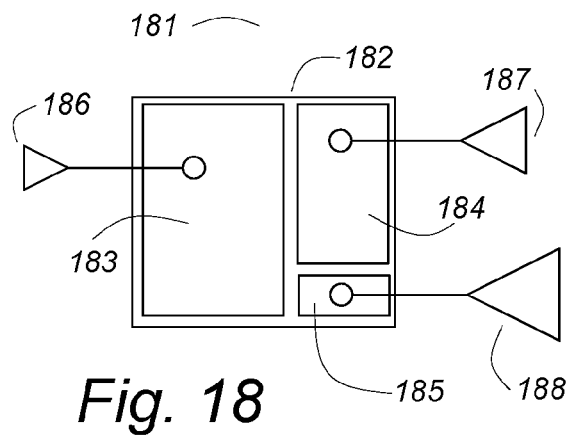
FIG. 18 shows a block diagram of a MOSFET having specialized cells for progressive switching. A first large group of cells is characterized for low $R_{DSon}$, a second group of cells has intermediate characteristics, and a third group of cells is characterized for very fast switching.

The cells of the MOSFET can be divided into groups, and the various groups can have individual drive circuits, controlled separately, as shown in FIG. 18. A synthetic diode 181 comprises a MOSFET die 182 which has three regions, a large region 183, a mediums sized region 184 and a small region, 185. Each region is has its own gate drive driven by gate drives 186, 187 and 188 respectively. As the current through the MOSFET decreases, first the larger region 183 would be turned off, then the medium region 184 and finally the small region 185.

Some cells, or groups of cells, could, together with their drivers, be optimized for speed. Other cells, or groups of cells, could, together with their drivers, be optimized for low forward voltage drop. Some could be optimized for analog controlled operation. A MOSFET die optimized for low conduction loss could be operated in parallel with a smaller MOSFET die optimized for speed. Whatever the optimum mix, as the current is ramping toward zero, all but a portion of the cells which are specialized for fast turn-off could be shut down ahead of time as long as at each instant there were a sufficient number of cells conducting with a low enough collective $R_{DS}$ so that the body diode was not forward biased.

Current Sensing:

It is known to divide out a few cells from a MOSFET as current sensing cells for current sensing, and such devices are readily available. This provides one method for measuring current. Another way to measure current is by sensing the voltage across a current shunt. While it would not be desirable to purposefully introduce a current shunt to measure current, it is possible that there would be a current path within the device or its circuitry that could be used to measure voltage drop to measure current.

For a MOSFET that is turned on and saturated, a way of estimating the current is by measuring the saturation voltage, knowing the $R_{DSon}$ for the conditions.

Once the gate voltage is dropping, this is no longer as simple. However gate voltage relates well to the current if the MOSFET is in its linear region. This may be the case at the end of the turn off sequence.

In a practical device, both may have to be monitored to know the current well enough for control. With a device having a progressive threshold, again knowing the gate voltage reveals the current if the MOSFET is in its linear region, and it reveals its current capacity if it is saturated.

It is an objective to have the device be out of saturation and turned off just at zero crossing, so it preferably goes into a linear mode at a low current.

In practice, the gate voltage could be monitored to know the current capacity, and the drain to source voltage could be monitored first to detect the start of a down ramp initially, second to ensure that MOSFET doesn't come out of saturation too much too early and third, to control the "end game", whether it be to let it go into a voltage controlled mode, or turn off somewhat early in favor of a Schottky end group, or just to anticipate and turn off (not voltage regulated) at as close to the right moment as possible.

The "voltage controlled" end game could reasonably kick in while the device was at a fairly high current, provided that it was established that a down ramp was under way. It would also be possible (and perhaps optimum, for fast circuits) to keep it in the linear mode entirely. In this scenario, the "controlled voltage" might be below the saturation for high currents, but as the current ramped down, control would start as soon as the device came out of saturation.

To monitor current in a device with a stepped progressive turn off of different groups, as each group is turned off, the current measuring algorithm would have to be modified accordingly, as a lower current would produce a higher drain voltage with some cells turned off already.

Regardless of the method used, as current sensing means is needed to monitor the current and either its rate of change or its crossing various thresholds.

Figure 19:
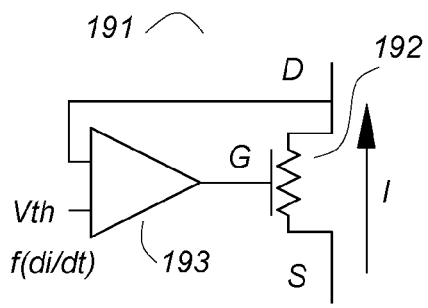
FIG. 19 shows a MOSFET and linear driver. The channel is shown as a resistor to emphasize the resistive nature of the drain-source conduction in the linear region.

Voltage Controlled Turn-Off:

FIG. 19 shows a synthetic rectifier 191 comprising a MOSFET 192 and a controller 193. The MOSFET 192 is shown for the purposes of this discussion as a resistor, as the channel impedance is controlled by the gate voltage. The controller 193 comprises an amplifier section with a reference voltage Vth. A voltage feedback from the drain of the MOSFET 192 controls the gate voltage so as to try to maintain a constant drain to source voltage.

This is a control algorithm that would be very effective for ensuring correct turn-off timing, either applied to the MOSFET as a whole or to groups of specialized cells and drivers which remain conducting as the current ramp approaches zero.

Assume that a negative current ramp has been detected, indicating incipient turn-off. As the current decreases, the voltage drop across $R_{DS}$ would decrease as well. A voltage feedback control circuit could modulate the gate voltage so that the voltage was controlled at some voltage greater than the saturation voltage for small currents.

As the current decreased further, the gate voltage would have to decrease, increasing the channel resistance to maintain the voltage. As the current goes to zero, the resistance would have to go to infinity, turning off the MOSFET.

It may be desirable to detect di/dt and modify the threshold voltage as a function of di/dt, as a lead to counter lags through the control function and the gate drive.

Voltage Controlled Progressive Turn-Off:

With voltage controlled progressive turn-off, the terminal voltage of the synthetic rectifier is monitored to sense current across the $R_{DSon}$. At a threshold that was below the saturated voltage at full load, the turn off sequence would be begun. As the current ramped down, the voltage across the device, $V_{DS}$, would begin to fall. Once it reached the threshold, a first section of the MOSFET would be turned off and latched. The voltage across the device would rise because the smaller number of cells conducting would have a higher $R_{DSon}$, which is why the latch is needed. As the current fell further, once again the threshold would be reached, and another section of the MOSFET could be turned off and latched, successively until the whole MOSFET were off.

It may be desirable to have a higher threshold which would sense if the current down ramp reversed, to reverse the sequence if necessary for abnormal conditions or control hiccups.

Current controlled progressive turn-off using a current sensing MOSFETAs described earlier, it is well known to use a small group of cells in a MOSFET for current sensing. Given a common gate connection, if the sources of the special current sensing cells are held equal in voltage to the source voltage of the rest of the cells, the current through the special current sensing cells will be proportional to the current through the rest of the cells.

This relationship holds as well for a MOSFET which is turned off progressively, except that the current will appear increase as the several sections are turned off. This is because as sections of the MOSFET are turned off, the rest of the MOSFET will have a higher current per cell just afterwards, then it will continue to ramp down.

Accordingly, as the current ramps down in the MOSFET, the current in the sense cells will ramp down proportionately. Once a first threshold is reached, a first section of the MOSFET can be turned off and latched off. At this instant, the current in the sense cells will step up, then ramp down again. When it reaches the threshold again, another section of the MOSFET can be turned off and latched off, and so on until the MOSFET is entirely turned off as the current reaches zero.

Optimizing the Controller Switching Rates:

Ideally, the synthetic rectifier should be able to sense and control properly for any circuit which has the general characteristics described here. In practice, circuit performance may be better if the synthetic rectifier and the PWM controller are matched and optimized as a set.

The task of sensing and timing the synthetic rectifier will be easier if the ramp times are slower. For some circuits, slow controller switching would increase switching losses, so that should only be done if more can be gained in the way of rectifier efficiency than is lost in the controller.

An exception is controllers that use resonant transitions for zero volt switching.

Another exception is the super fast switching method of the Provisional patent application entitled "Gate Drive Method and Apparatus for the Fast Switching of MOSFETs." As taught therein, the Miller current is more effectively overcome with a parallel capacitor from the drain to the source of the switching MOSFET. This capacitor slows the rise time (dv/dt) on the drain, and thus slows the switching time.

An interesting characteristic is that the time will be slower for light loads and much faster for heavy loads. Exactly the opposite effect is occurring in the secondary circuit, where the ramp rate of the current is fairly constant, causing the total transition time to be fast for light currents and slow for larger currents. With careful design, these delay times can be matched to some degree, to provide a more closely matched transition time for all load conditions.

Using Other Stimuli:

While the synthetic rectifier as outlined here does not need other stimuli, it would be foolish not to use them if it provides a better overall design.

As a hypothetical example, the best design for a particular application may require using a large, very low $R_{DS}$ MOSFET and over-driving its gate. The turn-off time may be too slow to use only the techniques described for the synthetic rectifier.

This large, slow MOSFET could be the first to turn off in a progressive turn-off sequence, and it may be necessary to start the turn-off earlier than the beginning of the current ramp down. A signal from the PWM controller could be very useful to start the sequence. Then, later stages of a progressive turn-off could use the techniques described for the synthetic rectifier to complete the turn-off sequence with precise timing.

Another possible input stimulus would be a "search winding" on the transformer, perhaps a single turn winding with no appreciable load. Such a winding will reveal the rate of change of the flux in the transformer core without the delay seen on the power windings attributable to changing currents in the leakage inductance of the power windings. Thus, a change of voltage would be apparent sooner than it would be if one looked only at the terminals of the power windings.

The circuits shown and described in this specification are simplified circuits to more clearly show the components at the heart of the invention. Practical power converter circuits will require additional components such as, as an illustration, not a limitation, snubbers, clamps, filters, bias resistors, control integrated circuits, house keeping voltage supplies, and so forth. The design of power converter circuits and the design and use of these additional components would be well known by one skilled in the art of power converter design.

The invention claimed is:

1. A synthetic rectifier comprising
a MOSFET having a gate, a source and a drain,
a control circuit for turning the MOSFET off and on,
a current sense means for sensing the current from the source to the drain through the MOSFET,
a voltage sense means for sensing the voltage from the drain to the source across the MOSFET,
the control circuit being responsive to a decreasing current from the source to the drain through the MOSFET so as to turn off the MOSFET when the current from the source to the drain through the MOSFET decreases to zero, and
the control circuit being responsive to a decreasing voltage from the drain to the source across the MOSFET so as to turn on the MOSFET when the voltage from the drain to the source across the MOSFET decreases to zero.

2. The synthetic rectifier of claim 1 wherein the current sense means comprises current sensing cells in the MOSFET.

3. The synthetic rectifier of claim 1 wherein the current sense means comprises the measurement of voltage from the source to the drain across the MOSFET while the MOSFET is turned on.

4. The synthetic rectifier of claim 1 wherein the current sense means comprises the measurement of voltage across a portion of a current conducting conductor that is in series with the source and the drain of the MOSFET while the MOSFET is turned on.

5. The synthetic rectifier of claim 1 wherein the control circuit maintains the voltage on the gate of the MOSFET at a voltage that is just sufficient to keep the MOSFET in saturation while the MOSFET is turned on so as to minimize the charge that must be removed from the gate of the MOSFET when the MOSFET is turned off, for faster switching.

6. The synthetic rectifier of claim 1 wherein the MOSFET comprises a plurality of cells that are divided into a first group of cells and at least a second group of cells the first group of cells collectively having a first gate connection,
the at least a second group of cells collectively having at least a second gate connection,
the control circuit having a first control output connected to the first gate connection to turn on and off the first group of cells
the control circuit further having at least a second output connected to the at least a second gate connection to turn on and off the at least a second group of cells so that the first group of cells and the at least a second group of cells can be turned off progressively as the current from the source to the drain through the MOSFET decreases to zero.

7. The synthetic rectifier of claim 6 wherein the first group of cells is characterized by having a very fast switching time and the at least a second group of cells is characterized by having a very low resistance from the source to the drain through the MOSFET when the MOSFET is turned on.

8. The synthetic rectifier of claim 6 wherein the first group of cells is characterized for linear operation after the at least a second group of cells has been turned off and until the current from the source to the drain through the MOSFET has decreased to zero.

9. The synthetic rectifier of claim 8 wherein after the at least a second group of cells has been turned off the first output of the control circuit controls the voltage on the first gate connection so that the voltage from the source to the drain across the MOSFET is held constant as the current from the source to the drain through the MOSFET decreases to zero.

10. The synthetic rectifier of claim 1 further comprising a Schottky rectifier connected in parallel with the source and the drain of the MOSFET so that the control circuit can turn off the MOSFET before the current from the source to the drain through the MOSFET has decreased entirely to zero and the Schottky rectifier will then conduct current through the synthetic rectifier.

11. The synthetic rectifier of claim 1 wherein the MOSFET comprises a plurality of cells and wherein the threshold voltage of individual cells of the plurality of cells varies with some of the plurality of cells having a higher threshold voltage, other cells of the plurality of cells having intermediate threshold voltages and still others of the plurality of cells having a lower threshold voltage so that as the control circuit reduces the voltage on the gate of the MOSFET to turn off the MOSFET, the plurality of cells turn off progressively, the some of the plurality of cells having the higher threshold voltage will turn off first, the other cells of the plurality of cells having the intermediate threshold voltages will turn off later and the still others of the plurality of cells having the lower threshold voltage will turn off last as the current from the source to the drain through the MOSFET decreases to zero.

12. The synthetic rectifier of claim 1 wherein the control circuit senses a current threshold as the current from the source to the drain through the MOSFET decreases toward zero and initiates turn off of the MOSFET when the current from the source to the drain through the MOSFET crosses the current threshold, the current threshold being set to the current that is the product of the rate of change of the current from the source to the drain through the MOSFET in amperes per second and the time that it takes to turn off the MOSFET in seconds.

* * * * *